Jan. 16, 1940.                L. OECKL                2,187,692
AUTOMATIC NAIL DRIVING HAMMER OPERATED BY MEANS OF COMPRESSED AIR
Filed Aug. 12, 1937
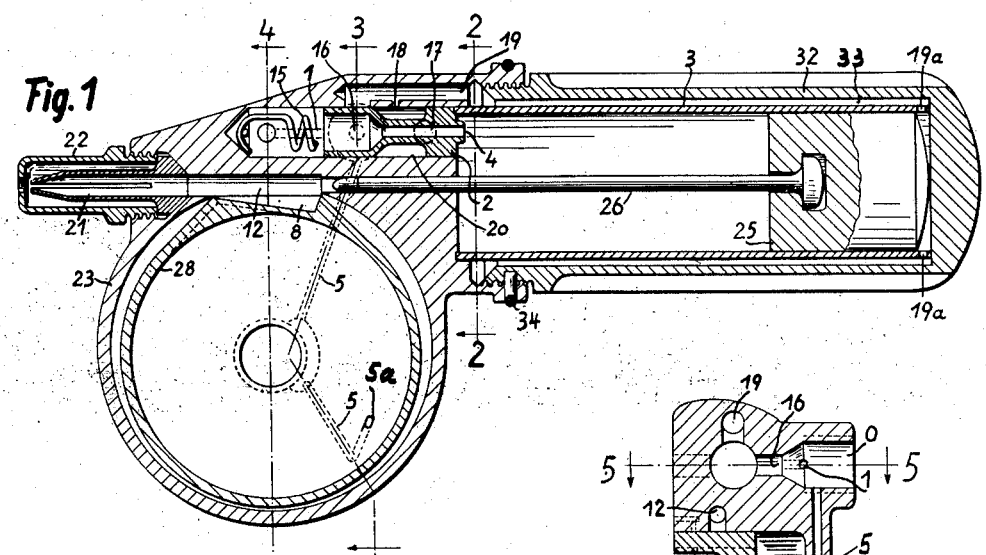
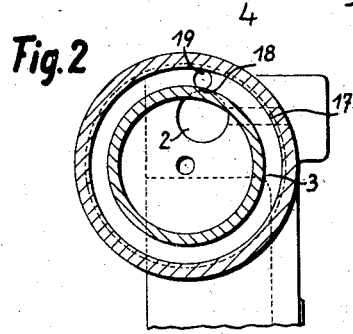
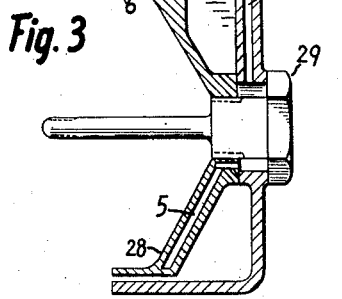
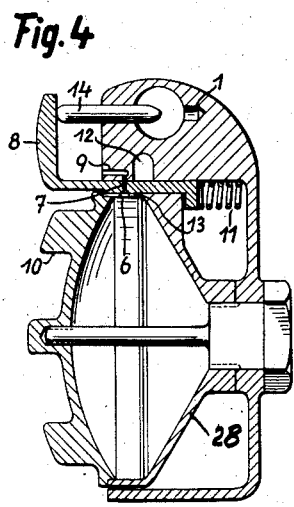
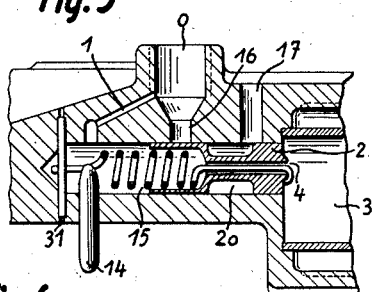
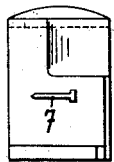
INVENTOR.
Ludwig Oeckl Patented Jan. 16, 1940

2,187,692

UNITED STATES PATENT OFFICE 2,187,692

AUTOMATIC NAIL DRIVING HAMMER OPERATED BY MEANS OF COMPRESSED AIR

Ludwig Oeckl, Dessau, Germany

Application August 12, 1937, Serial No. 158,685

2 Claims. (Cl. 1—46.1)

More especially my invention embodies new and useful improvements in a fully automatically working nail driving hammer, to be easily handled and operated with the right hand and thumb respectively only, thus enabling the operator with his left hand to take care of the work.

One of the objects of my invention is to provide an automatic nail driving hammer which is operable, regardless of its angle and position of application to the work without making any adjustments on the tool.

Another object of the present invention is to drive the nail with a single blow, therefore keeping the consumption of compressed air at a very low level. The air pressure required is from 50 to 70 pounds per square inch, the volume about 5 cubic feet of free air per minute.

Still another object of the present invention is to provide an automatic nail driving hammer especially constructed to drive small nails up to ½" in length, that is such nails which are very troublesome to handle, expensive and in cases even injurious to work with if driven by hand. The number of nails to be driven per minute is 100.

It is a further object of my invention that the delivery of the nail from a closed nail container to a position from where, upon application of thumb pressure the nail may be driven into the workpiece is done wholly automatically by means of compressed air.

A still further object of my invention is that several sizes of nails can be used on one driver, requiring only the change of the nail transferring member.

In the accompanying drawing:

Fig. 1 is a longitudinal section of the entire device, showing the valve, driving pin, piston, cylinder and capscrew with its lockwire at the right side, the housing or body portion, nail container, nail transferring member and nail centering bushing with its fastening screw at the left side. The valve and the piston are shown in the extended position that is under the application of air pressure.

Fig. 2 is a sectional view on line 2—2 of Fig. 1.

Fig. 3 is a sectional view on line 3—3 of Fig. 1, showing various air canals from the airhose connection to the nail container and to the intake ways of the cylinder.

Fig. 4 is a sectional view on line 4—4 of Fig. 1, illustrating the closed nail container and a side elevation of the nail transferring member in its fixed position to be charged and the interconnection of the shut off pin to said member.

Fig. 5 is a longitudinal section on line 5—5 of Fig. 3 with the valve and the shut off pin in the extended position, illustrating the adoption of the shut off pin to actuate the valve when moved with the nail transferring member as shown in Fig. 4.

Fig. 6 is a top view of the nail transferring member in relation to its position in Fig. 1, as indicated by the outline of its wedge shaped part.

Fig. 6a is a front elevation of the nail transferring member in relation to the Figs. 6 and 1, illustrating the recess adapted to transfer the nail.

Referring to the drawing 0 Figs. 3 and 5 is the airhose connection. The air pressure enters through canal 1 Figs. 5, 3 and 1, pushes the valve 2 against the inserted cylinder 3, passes through passage 4 of said valve, enters the cylinder room and moves the piston 25 to its upper end position, Figs. 1 and 5. As the shut off pin 14 Figs. 4 and 5 is also subjected to this air pressure it is moved to its end position as fixed by the nail transferring member 8 Fig. 4. The air pressure applied will keep said parts in positions as described above, overcoming the force of spiral spring 15 connected to valve 2 Figs. 1 and 5, which has a tensional power of about 10 pounds. As soon as the piston hits the upper end of the cylinder the air pressure from passage 4 passes out through the clearance between the piston 25 and the cylinder 3 in the open outlet canals 19a, 33, 19, 18, circular groove 20 of valve 2 and outlet 17 Figs. 1 and 5. The area of the piston clearance exceeds the area of passage 4.

The closed nail container 28 Fig. 4 is also directly and constantly subjected to air pressure from the airhose connection 0 Figs. 3 and 1. Air pressure enters through canals 5—5 Figs. 3 and 1 and 5a Fig. 1 of the closed nail container and passes out through a suitable opening 6 Figs. 3 and 4 of said container and the recess 7 of the nail transferring member 8 Figs. 6a and 4 and the rectangular passage 9 Fig. 4. The recess 7 of the nail transferring member 8 is in steady alignment with the opening 6 and the passage 9 as illustrated in Fig. 4, thus creating a continuous flow of air within the closed container 28 from the canal 5—5a Fig. 1 thereof to the passage 9 Fig. 4.

The direction of the axis of canal 5a Fig. 1 in relation to the inner circumference of said nail container is arranged as to partly convert the constantly incoming airstream into a circular moving airflow having the tendency to agitate the nails in the same manner. The outstreaming air through passages 6, 7, and 9, Fig. 4, causes a nail to be lodged in the recess 7 of transfer member 8. The recess 7, Figs. 4 and 6a, is substantially of the same outline as one of the nails and thus will receive the nail only when the nail is in a fixed definite relation to the recess. The passage 9 which permits the outflow of air from the device is, in contour, smaller than the contour of the nail, and thus holds it in position in the transfer member 8. The cross section of the nail transferring member 8 Fig. 1 in relation to the top view Fig. 6 of said member illustrates the location of the nail in the recess of said member with the nailhead next to the driver pin 26 Fig. 1. As soon as the recess 7 in the manner described is charged with one of the rotating nails, said nail by means of pressure created by the air passing out between the clearance of the nail and said recess, is kept in place.

The recess 7 of the nail transferring member 8 is kept in alignment with the passage 9 in order to be lodged with a nail as described in the foregoing paragraph by means of a nose piece of said member 8 which hits against the nail container 28 as shown in Fig. 4.

In order to drive the nail, thumb pressure applied upon said nail transferring member 8 will move same into a position where the recess 7 aligns with an air passage 13 of the nail container 28 and the driver passage 12 Figs. 4 and 1, whereat the nail by means of air pressure is blown out of said recess into the driver passage and to the nail centering bushing 21 Fig. 1. Passage 13 is subjected to constant air pressure from the nail container, Fig. 4. The driver passage permits not the nail to be twisted or turned about 180°, therefore the delivery of the nail to said nail centering bushing in the way blown in and to be driven is assured. With the nail transferring member in the alignment as described the opening 6 of the container 28 is shut. The discharging of the nail transferring member as described is done while the recess 7 passes the canal 13. The nail transferring member is to be moved further on until shut off pin 14, which moves mutually with said member as illustrated in Fig. 4 shuts off the air pressure at the canal 1, Figs. 4 and 5, that actuated valve 2 Figs. 1 and 5.

Said valve 2 is now released from the air pressure and retracted by the spring 16 to a position fixed by the shut off pin 14. With the valve 2 in this position the circular groove 20 of said valve aligns with canals 16 and 19 Figs. 5, 3 and 1 and permits air pressure from the airhose connection 0 to enter said canals and over room 33 and holes 19a the cylinder 3 and move the piston 25 and the driver pin 26 in order to drive the nail, Fig. 1. With the valve 2 in said retracted position passage 18 Figs. 1 is closed and the exhaust passage 17 Figs. 1 and 5 is opened. Thus the air pressure that kept the piston 25 in the upper end position of the cylinder is released. The nail centering bushing 21 Fig. 1 through which the nail and the point of the driver pin pass is a cylindrical bushing, on one end in a conical manner closed in order to center the nail and 4 times slotted to act like grippers.

After the blow or stroke respectively thumb pressure upon the nail transferring member is released and said member is retracted by the spring 11 to its fixed position as shown in Fig. 4. Therefore the shut off pin 14 is blown into the position as shown in Fig. 4 by the air pressure from canal 1 and also is the valve 2 and the piston 25 returned as described.

33 Fig. 1 is the room surrounding the cylinder 3. The driving pin 26 is fastened to the piston 25. The nail container 28 is fastened to housing or body portion 23 by the screw 29, the extension of which is adapted to fasten the container cover 10. The spiral spring 15 is hooked to pin 31 Fig. 1. 34 Fig. 1 is a lockwire to secure the capscrew 32.

I claim as my invention:

1. An automatic nail driving hammer, operated by means of compressed air, comprising a driver, a driver passage, a closed nail container and a movable nail transferring member having a recess of substantially the outline of one of the nails to be driven, said transferring member being movable from a position in which said recess communicates with said closed container and with an exhaust passage, to a position in which it communicates with the driver passage and with an air supply passage: said closed container being subjected to air under pressure in a manner causing the incoming air to activate the supply of nails and cause the recess of the nail transferring member to be chargd with a single nail when in position to communicate with the nail container.

2. A device as in claim 1 in which the driver is operated by compressed air under the control of valve mechanism and is caused to operate by means associated with said movable nail transferring member.

LUDWIG OECKL.